(12) United States Patent
Ngai et al.

(10) Patent No.: US 7,085,322 B2
(45) Date of Patent: Aug. 1, 2006

(54) DISTRIBUTED CONTROL STRATEGY FOR DYNAMICALLY ENCODING MULTIPLE STREAMS OF VIDEO DATA IN PARALLEL FOR MULTIPLEXING ONTO A CONSTANT BIT RATE CHANNEL

(75) Inventors: Agnes Y Ngai, Endwell, NY (US); Edward F Westermann, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 718 days.

(21) Appl. No.: 10/051,004

(22) Filed: Jan. 18, 2002

(65) Prior Publication Data

US 2002/0094031 A1    Jul. 18, 2002

Related U.S. Application Data

(63) Continuation-in-part of application No. 09/087,603, filed on May 29, 1998.

(51) Int. Cl.
*H04N 7/18* (2006.01)
(52) U.S. Cl. ............................. 375/240.25; 375/240.26
(58) Field of Classification Search .............................. 375/240.01–240.29
See application file for complete search history.

(56) References Cited

U.S. PATENT DOCUMENTS

| 5,115,309 | A | * | 5/1992 | Hang ....................... 348/388.1 |
| 5,576,765 | A | | 11/1996 | Cheney et al. ............... 348/407 |
| 5,617,150 | A | * | 4/1997 | Nam et al. .................. 348/700 |
| 5,764,293 | A | | 6/1998 | Uz et al. .................. 348/390.1 |
| 5,805,220 | A | * | 9/1998 | Keesman et al. ...... 375/240.01 |
| 5,854,658 | A | | 12/1998 | Uz et al. .................... 348/419 |
| 6,005,620 | A | | 12/1999 | Yang et al. .................. 348/385 |
| 6,040,861 | A | | 3/2000 | Boroczky et al. ........... 348/409 |
| 6,084,910 | A | | 7/2000 | Stanger et al. .............. 375/240 |

(Continued)

FOREIGN PATENT DOCUMENTS

EP      1005233 A1    5/2000

(Continued)

OTHER PUBLICATIONS

Guha, A., Multichannel Joint Rate Control of VBR MPEG Encoded Video for DBS Applications, Aug. 1994, IEEE Transactions on Consumer Electronics, vol. 40, No. 3, pp. 616-623.*

(Continued)

*Primary Examiner*—Andy Rao
(74) *Attorney, Agent, or Firm*—William H. Steinberg, Esq.; Kevin P. Radigan, Esq.; Heslin Rothenberg Farley & Mesiti, P.C.

(57) ABSTRACT

A distributed control strategy is provided for dynamically encoding multiple streams of video data in parallel for multiplexing onto a constant bit rate channel. The control strategy is a single pass strategy which allows individual encode bit rates to be dynamically adjusted for each video data stream based in part on relative complexity of the multiple streams of video data, as well as fullness of compressed video data buffers coupled between the encoders and the constant bit rate channel. The control strategy includes encoding the multiple streams of video frames in parallel using multiple encoders, exchanging one or more statistics between the encode processes using an exchange interface, and dynamically adapting encoding of at least one stream of the video frames using the exchanged statistics based on relative complexity of the video frames.

45 Claims, 10 Drawing Sheets

U.S. PATENT DOCUMENTS

| | | | | |
|---|---|---|---|---|
| 6,118,823 | A | 9/2000 | Carr et al. | 375/240.28 |
| 6,167,084 | A | 12/2000 | Wang et al. | 375/240.02 |
| 6,181,821 | B1 * | 1/2001 | Lim | 382/232 |

FOREIGN PATENT DOCUMENTS

| | | |
|---|---|---|
| JP | 2000078577 | 3/2000 |
| WO | WO 00/41397 | 7/2000 |

OTHER PUBLICATIONS

Haskell, Barry. Multiplexing of Variable Rate Encoded Streams, Aug. 1994, IEEE Transactions on Circuits and Systems for Video Technology, vol. 4, No. 4, pp. 417-424.*

Wang, Limin. Joint Rate Control for Multi-Program Video Coding, Aug. 1996, IEEE Transactions on Consumer Electronics, vol. 42, No. 3, pp. 300-305.*

IBM Technical Disclosure Bulletin, vol. 40, No. 10, Oct. 1997, "Structured Metadata for Application Specific Viewers for Streamed Internet Video/Audio", pp. 123-127.

Mohsenian et al. pending U.S. Appl. No. 09/044,642, filed Mar. 19, 1998, entitled "Real-Time Single Pass Variable Bit Rate Control Strategy and Encoder".

Boice et al., pending U.S. Appl. No. 09/046,118, filed Mar. 20, 1998, entitled "Adaptive Encoding Of A Sequence Of Still Frames Or Partially Still Frames Within Motion Video"

Boroczky et al., pending U.S. Appl. No. 09/087,603, filed May 29, 1998, entitled "Control Strategy For Dynamically Encoding Multiple Streams Of Video Data In Parallel For Multiplexing Onto A Constant Bit Rate Channel"

"Boroczky et al., pending U.S. Appl. No. 09/225,193, filed Jan. 5, 1999, entitled" Adaptively Encoding Multiple Streams Of Video Data In Parallel For Multiplexing Onto A Constant Bit Rate Channel.

"Statistical Multiplexing Using MPEG-2 Video Encoders", L. Boroczky, A.Y. Ngai, E.F. Westermann, Journal of Research and Development, vol. 43, No. 4, Jul. 1999, pp. 510-520.

* cited by examiner

KEY FOR FIG. 8B

| | |
|---|---|
| $i$ | ENCODER INDEX. (1 THRU n) |
| n | INDEX OF LAST ENCODER IN SYSTEM |
| SUM | CONTROL WORD WRITTEN TO COMMAND (CMD) BUS SIGNALING THE SUMMING OF THE VALUE BEING PASSED |
| TOTAL | CONTROL WORD WRITTEN TO CMD BUS SIGNALING THE TOTAL OF THE VALUE BEING PASSED |
| V | VALUE READ FROM THE DATA BUS |
| $V_i$ | VALUE CALCULATED BY EACH INDIVIDUAL ENCODER$_i$ |
| $V_{SND}$ | VALUE WRITTEN TO DATA BUS |
| $V_T$ | TOTAL VALUE (SAVED BY ENC$_i$) |
| == | MEANS EQUAL TO |
| = | MEANS IS BEING ASSIGNED THE VALUE OF |

*fig. 8A*

DISTRIBUTED CONTROL STRATEGY FOR DYNAMICALLY ENCODING MULTIPLE STREAMS OF VIDEO DATA IN PARALLEL FOR MULTIPLEXING ONTO A CONSTANT BIT RATE CHANNEL

CROSS-REFERENCE TO RELATED PATENTS/APPLICATIONS

This application is a continuation-in-part of a U.S. patent application entitled "Control Strategy For Dynamically Encoding Multiple Streams Of Video Data In Parallel For Multiplexing Onto A Constant Bit Rate Channel", by Boroczky et al., U.S. Ser. No. 09/087,603, filed May 29, 1998, which is hereby incorporated herein by reference in its entirety.

In addition, this application contains subject matter which relates to the subject matter of the following commonly-owned patents and applications, each of which is hereby incorporated herein by reference in its entirety:

"Control Scheme For Shared-Use Dual-Port Predicted Error Array", by Carr et al., U.S. Pat. No. 6,118,823, issued Sep. 12, 2000;

"Real-Time Single Pass Variable Bit Rate Control Strategy And Encoder", by N. Mohsenian et al., U.S. Ser. No. 09/044,642, filed Mar. 19, 1998;

"Adaptive Encoding Of A Sequence Of Still Frames Or Partially Still Frames Within Motion Video", by Boice et al., U.S. Ser. No. 09/046,118, filed Mar. 20, 1998;

"Adaptively Encoding Multiple Streams of Video Data In Parallel For Multiplexing Onto A Constant Bit Rate Channel", by Boroczky et al., U.S. Ser. No. 09/225,193, filed Jan. 5, 1999; and "Adaptive Real-Time Encoding Of Video Sequence Employing Image Statistics", by Boroczky et al., U.S. Pat. No. 6,040,861, issued Mar. 21, 2000.

TECHNICAL FIELD

This invention relates in general to compression of digital visual images, and more particularly, to a distributed control strategy for dynamically encoding multiple streams of video data in parallel for multiplexing onto a constant bit rate channel. The distributed control strategy comprises a single pass encode strategy which allows individual encode bit rates to be dynamically adjusted within each video data stream based in part on relative complexity of the multiple streams of video data.

BACKGROUND OF THE INVENTION

The emergence of various digital video technologies in industries such as broadcast television, communications networks, consumer electronics, and multimedia computers continues to increase at a remarkable rate. This widespread use of digital video applications is motivated by the fact that signal processing, editing and data transfer of digital information is much easier compared with processing of analog representations. But as importantly, digital video owes its popularity to the several standards that have been created for digital video compression in recent years.

Digital video compression solutions are arguably the most important component of any digital video platform. Since digital video is known to contain an enormous amount of information in uncompressed format, its manipulation, storage, and transmission can be very time consuming and expensive, if not impossible. As a result, digital video compression techniques have been devised to reduce the overwhelming volume of data while preserving the perceptual quality of its content. A compatible video decompression scheme is then used to uncompress the data for playback.

The MPEG-2 International Standard formed by the Moving Pictures and Expert Group, and described in ISO/IEC 13818-2, "Information Technology—Generic Coding of Moving Pictures and Associated Audio Information: Video 1996," which is hereby incorporated herein by reference in its entirety, is intended to standardize compression for the industries noted above. The ISO MPEG-2 standard specifies the syntax of the encoded bitstream and semantics of the decoding process. The choice of coding parameters and tradeoffs in performance versus complexity, however, are left to the encoder developer.

The efficiency of the MPEG-2 encoding system is assessed by the fidelity of the perceived video transmitted over a fixed communication bandwidth or stored into a digital medium. For some applications, such as digital satellite systems, multiple programs are multiplexed into a single large stream for broadcasting, and a bank of MPEG-2 encoders is used to monitor and encode all programs, while attempting to maintain the quality of the received channels. The MPEG-2 stream is sent over either a fixed communications bandwidth or a dynamic bandwidth as in asynchronous transfer mode (ATM) networks.

In typical statistical multiplexing systems, such as direct broadcast satellite (DBS) applications, several video bitstreams (or programs) are multiplexed onto one single constant bit rate channel. Unfortunately, encoding of each program at a predefined constant bit rate can lead to picture quality degradation due to changes of scene content in the programs over time. The problem becomes more complex if the operation of the encoders is not aligned in time, such as when coding varies among the encoders with respect to differing group-of-pictures (GOP) structures and/or differing picture-encode start times.

A need thus exists in the art for a multi-program compression technique which dynamically distributes available bandwidth among programs in order to optimize overall video quality of the system. The present invention provides such a technique by employing a joint rate control strategy which guides the individual encoders dynamically during the encoding process.

SUMMARY OF THE INVENTION

Video on demand and interactive television are examples of applications that require real-time encoder outputs for multiplexing onto a single medium of constant channel rate. One approach for such a system is described in the above-incorporated, commonly assigned U.S. patent application Ser. No. 09/087,603, entitled "Control Strategy For Dynamically Encoding Multiple Streams Of Video Data In Parallel For Multiplexing Onto A Constant Bit Rate Channel". Briefly, the control strategy disclosed therein employs a separate master controller or processor to handle the joint rate control, monitor the aggregate encoder outputs, regulate encoder usage, and control encoding options. Additionally, a separate system or channel buffer is used to prevent channel overrun and underflow. Thus, in addition to the encoders, several component parts are needed to implement the system described in this co-pending application. The present invention enhances the control strategy disclosed therein by providing an architecture which allows the encoders themselves and their individual buffers to perform the functions of the master controller and system buffer described in this co-pending application, thus simplifying and economizing the design of the system by eliminating the need for extra components.

Briefly described, the invention comprises in one aspect a method of processing multiple streams of video frames. This method includes: employing multiple encode processes to encode multiple streams of video frames in parallel; exchanging at least one input statistic or encode statistic between the multiple encode processes; and dynamically adapting encoding of at least one stream of video frames of the multiple streams of video frames based on relative complexity of the video frames comprising the multiple streams of video frames employing the at least one input statistic or encode statistic exchanged between the encode processes.

In another aspect, a method of processing multiple streams of video frames is provided which includes: encoding the multiple streams of video frames in parallel employing multiple encode processes, the encoding including employing at least one controllable encode parameter for each stream of video frames; during the encoding, analyzing each stream of video frames to derive information on at least one characteristic thereof, the at least one characteristic comprising at least one of an intraframe characteristic or an interframe characteristic; exchanging the information derived on the at least one characteristic of each stream of video frames between the multiple encode processes; and dynamically adapting encoding of at least one stream of video frames using relative information on the at least one characteristic obtained from each stream of video frames of the multiple streams of video frames, the dynamically adapting including for the at least one stream of video frames adjusting the at least one controllable encode parameter employed in encoding, wherein the encoding of each stream of video frames is dynamically adaptive to relative changes in the at least one characteristic obtained from the multiple streams of video frames by exchanging the information on the at least one characteristic of the multiple streams of video frames between the multiple encode processes.

System and computer program products corresponding to the above-summarized methods are also described and claimed herein.

To restate, presented herein is a system solution for statistical multiplexing (stat-mux) which encodes several video programs in parallel using, for example, MPEG-2 compatible video encoders. A joint rate control strategy is presented which dynamically allocates bit rates among the encoders. The bit rate of each encoder is determined based on relative complexities of the programs and scene changes occurring within the programs being encoded. The technique requires no external pre-processing of the input video signals. Furthermore, the encoding of video sources is not restricted to requiring the same GOP structure and GOP length in each encoder. Advantageously, each encoder can change its bit rate at GOP boundaries, while still operating at constant bit rate inside the GOPs. Overall, this strategy results in a piece-wise constant, but variable bit rate compression. Alternatively, each encoder could change its bit rate at picture boundaries in another embodiment. The encoders can operate with different GOP-lengths and structures, and can be encoding at different times. Thus, there can be time intervals when the sum of the individual bit rates is larger or smaller than the predefined channel bit rate. Further, a strategy is proposed for scene changes which ensures quick reaction of the system to scene changes, thereby resulting in improved picture quality.

Also disclosed herein is an exchange interface which allows multiple encoders to share a constant channel rate in a statistical multiplex system. The exchange interface allows the joint rate control function to be distributed among the encoders, thereby providing an effective system-wide joint rate control without employing external rate control processing. Additionally, the video buffer verifier (VBV) of each encoder can be modified to compensate for output quality without limitation of the individual buffer levels. That is, the function of a system or channel buffer can alternatively be distributed among the individual encoder buffers. The encoder architecture of this embodiment provides a compact, simple system, designed to accommodate the encoding of multiple concurrent programs.

Additional features and advantages are realized through the techniques of the present invention. Other embodiments and aspects of the invention are described in detail herein and are considered a part of the claimed invention.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which:

FIG. 8A is a key of terms for the flowchart of FIG. 8B;

BEST MODE FOR CARRYING OUT THE INVENTION

Figure 1:
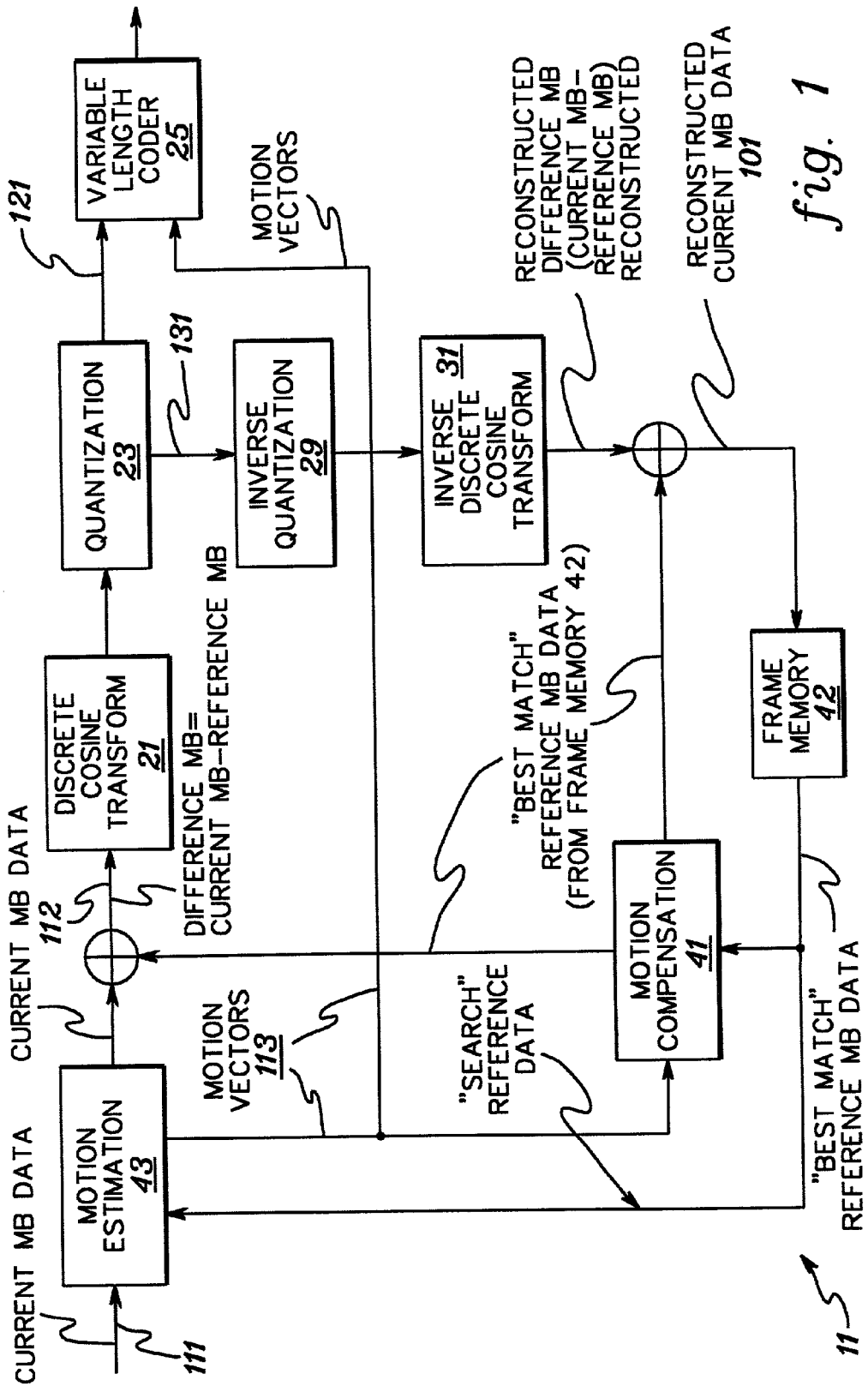
FIG. 1 shows a flow diagram of a generalized MPEG-2 compliant encoder 11, to be employed in a statistical multiplexer (stat-mux) system in accordance with the principles of the present invention.
Figure 2:
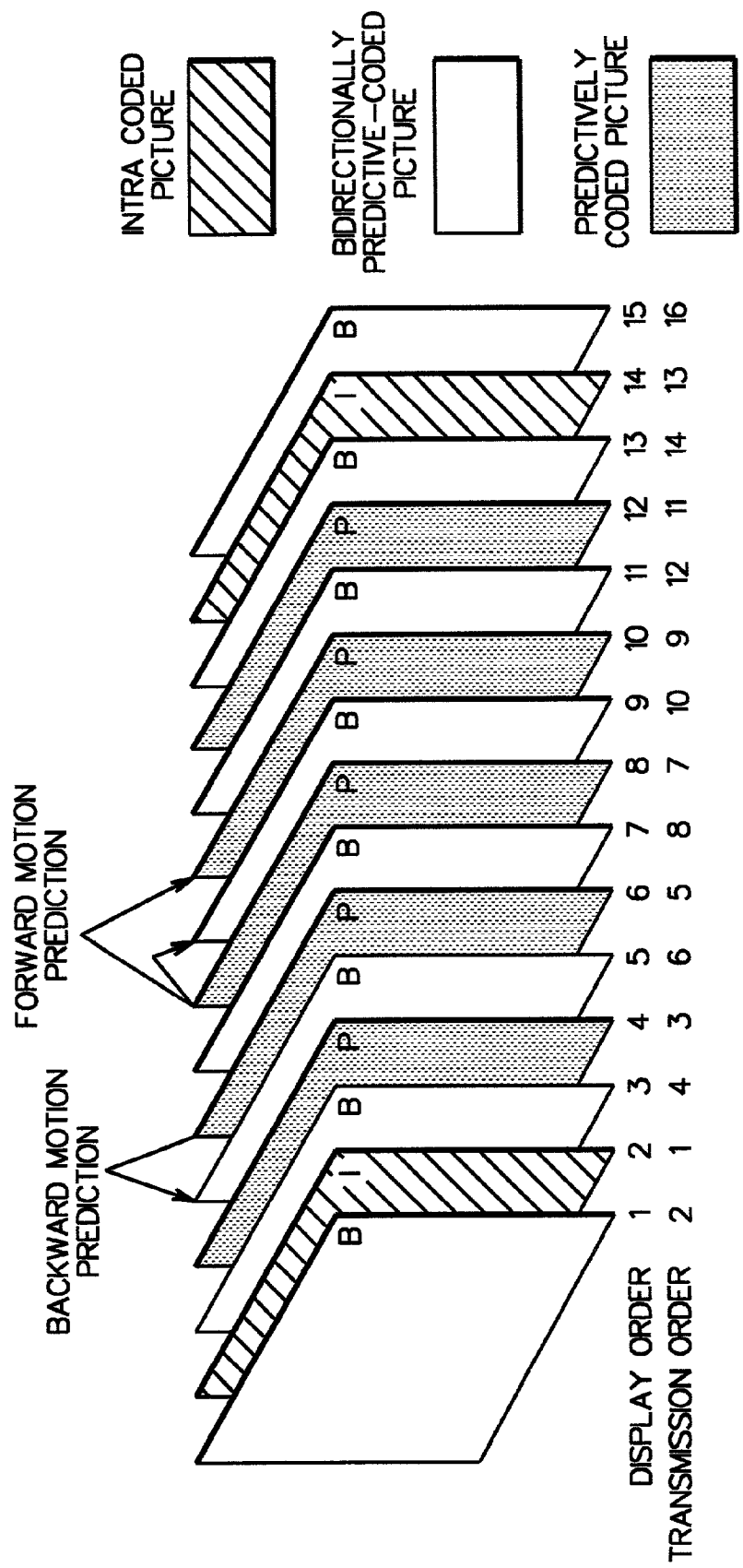
FIG. 2 illustrates I, P, and B pictures, examples of their display and transmission orders, and forward, and backward motion prediction.

As briefly noted above, this invention relates to a statistical multiplexing control strategy for encoding multiple streams (e.g., channels) of video programs in parallel using multiple video encoders. A joint rate control strategy is employed which dynamically allocates bit rates among the encoders (which may comprise MPEG compliant encoders and encoding processes such as described in the above-incorporated MPEG-2 International Standard). The bit rate of each encoder is determined based on relative complexities of the programs and adjustments are made at scene changes and GOP boundaries inside the programs. The proposed technique does not require any external preprocessing of the input sources. FIGS. 1 & 2 depict the operation of a single video encoder which can be employed in a control strategy in accordance with this invention.

For purposes of illustration, a generalized flowchart of MPEG compliant encoding is shown in FIG. 1. In the flowchart, the images of the $i^{th}$ picture and the $i+1^{th}$ picture are processed to generate motion vectors. The motion vectors predict where a macroblock of pixels will be in a prior and/or subsequent picture. The use of motion vectors is a key aspect of temporal compression in the MPEG standard. As shown in FIG. 1, once generated, motion vectors are used for the translation of the macroblocks of pixels, from the $i^{th}$ picture to the $i+1^{th}$ picture.

In the encoding process of FIG. 1, the images of the $i^{th}$ picture and the $i+1^{th}$ picture are processed in encoder 11 to generate motion vectors. An input image 111 of a subsequent picture goes to the motion estimation unit 43 of the encoder. Motion vectors 113 are formed as the output of the motion estimation unit 43. These vectors are used by the motion compensation unit 41 to retrieve macroblock data from previous and/or future pictures, referred to as "reference" data, for output by this unit. One output of the motion compensation unit 41 is negatively summed with the output from the motion estimation unit 43 and goes to the input of the discrete cosine transformer (DCT) 21. The output of the discrete cosine transformer 21 is quantized in a quantizer 23. The output of the quantizer 23 is split into two outputs, 121 and 131; one output 121 goes to a downstream element 25 for further compression and processing before transmission, such as to a run length encoder; the other output 131 goes through reconstruction of the encoded macroblock of pixels for storage in frame memory 42. In the encoder shown for purposes of illustration, this second output 131 goes through an inverse quantization 29 and an inverse discrete cosine transform 31 to return a lossy version of the difference macroblock. This data is summed with the output of the motion compensation unit 41 and returns a lossy version of the original picture to the frame memory 42.

As shown in FIG. 2, there are three types of pictures. There are "Intra pictures" or "I" pictures which are encoded and transmitted whole, and do not require motion vectors to be defined. These "I" pictures serve as a reference image for motion estimation. There are "Predicted pictures" or "P" pictures which are formed by motion vectors from a previous picture and can serve as a reference image for motion estimation for further pictures. Finally, there are "Bidirectional pictures" or "B" pictures which are formed using motion vectors from two other pictures, one past and one future, and can not serve as a reference image for motion estimation.

The various picture types are quantized by encoder 11 in several steps. First, a quantization matrix, unique to a picture type, is applied to an 8×8 DCT block. The elements (weights) of the matrix are chosen such that importance is given to low frequency coefficients. These coefficients contain more information and contribute more to the perceptual quality of the picture. Then, a quantization scaling factor is computed based on the local image activity, complexity of the picture type, and a measure of buffer fullness. This index is directly related to the number of bits allocated to a picture and its perceived quality. The actual number of bits is obtained by first scanning each DCT block and then grouping the quantized coefficients together, according to the procedures defined in the MPEG-2 standard. Each group is entropy coded with a unique variable length code (VLC), using a Huffman lookup table. DC coefficients are encoded, employing differential pulse code modulation (DPCM) (similar to encoding of motion vectors) and uniform quantization.

The output of the entropy coder is input to an entropy decoder. The output of the decoder goes through an inverse scan, inverse quantization and inverse discrete cosine transformation to return a lossy version of the difference macroblock. The decoded picture is then passed through a delay to motion estimation and/or motion compensation, as is known in the art.

The operational functions of an MPEG-2 encoder are discussed in greater detail in the above-incorporated, commonly assigned U.S. Pat. No. 6,118,823 to Carr et al., entitled "Control Scheme For Shared-Use Dual-Port Predicted Error Array". The fundamentals of constant bit rate (CBR) and variable bit rate (VBR) encoding schemes are described with reference to groups of pictures (GOPs) or frames in detail in the above-incorporated U.S. patent application Ser. No. 09/044,642, by N. Mohsenian, filed Mar. 19, 1998, entitled "Real-Time Single Pass Variable Bit Rate Control Strategy And Encoder". Adaptive encoding of a sequence of frames using image statistics such as described herein below, is described in additional detail in the above-incorporated U.S. patent application Ser. No. 09/046,118, by Boice et al., filed Mar. 20, 1998, entitled "Adaptive Encoding Of A Sequence Of Still Frames Or Partially Still Frames Within Motion Video". A control strategy such as described herein below, is described in additional detail in the above-incorporated, commonly assigned U.S. Pat. application Ser. No. 09/087,603, by Borosky et al., entitled "Control Strategy For Dynamically Encoding Multiple Streams Of Video Data In Parallel For Multiplexing Onto A Constant Bit Rate Channel".

With the above information as background, statistical multiplexing and rate control in accordance with the principles of the present invention is described below with reference to FIGS. 3–10.

In typical statistical multiplexing systems, several video bitstreams are multiplexed onto one single constant bit rate channel. Unfortunately, encoding of each program at a predefined constant bit rate can lead to picture quality degradation due to changes in scene content over time. Thus, an underlying objective of multi-program compression in accordance with the present invention is to dynamically distribute the available bandwidth among the programs in order to maximize the overall video quality of the system. This corresponds to equalizing the picture quality of all programs using a joint rate control algorithm that guides the individual coders. The invention allocates bit rates among the encoders according to the relative scene content of the video sources, while still meeting the requirement of a fixed channel bit rate.

More particularly, a system solution for statistical multiplexing is presented for encoding several video programs in parallel using MPEG-2 compatible video encoders. In one embodiment, an external joint rate control algorithm that dynamically allocates bit rates among the encoders is described. The bit rate of each encoder is determined based on relative complexities of the programs and scene changes inside the programs. A system/method in accordance with the present invention does not require any external preprocessing of the input sources. Furthermore, the encoding of video sources is not restricted to having the same GOP structure or GOP length in each encoder. Each encoder changes its bit rate at GOP boundaries according to the joint rate control, while it operates at constant bit rate inside the GOPs. Overall, this strategy results in a piece-wise constant, variable bit rate compression. Experimental results show that a multi-program video compression system in accordance with the present invention results in good picture quality without external preprocessing, despite its relative simplicity. Furthermore, commercially available MPEG-2 encoder chips can be used successfully in this system.

Basically, two different approaches are possible for joint rate control, a feedback-approach or a look-ahead approach. In a feedback approach, statistics are generated by the encoders as a by-product of the encoding process. These statistics are then used to control the bit-allocation for the subsequent pictures. In a look-ahead approach, statistics are computed by a preprocessor prior to encoding, with these statistics then being used to adjust the bit rates before encoding the pictures. With either approach, finding the optimum statistics which describe the complexity of a program can be challenging. In the feedback approach, the statistics are mostly limited to coding related quantities. The look-ahead approach can have more freedom but the price is extra computational complexity and/or additional devices.

In both approaches, a joint rate control algorithm would calculate the bit rate for each picture and carry out the entire rate control for each of the individual encoders. This results in variable bit rate encoding. Conventionally, such a rate control algorithm would require mostly identical GOP structure in each encoder, which is, however, far from reality. Encoders can and do operate in different GOP lengths and structures.

Pursuant to this invention, a solution is disclosed for statistical multiplexing by dynamically allocating bit rates for the encoders using a feedback-approach. The rate control strategy distributes the channel bit rate among the encoders based on the relative complexity of the programs. The complexity of the programs is determined using coding statistics that are generated by the encoders along with the compressed bitstreams.

Instead of calculating the target bit rate for each picture by the joint rate control algorithm, the bit rates are changed at GOP boundaries, or if a scene change occurs. This strategy allows the encoders to operate at constant bit rate inside the GOPs, resulting in a piece-wise constant, but variable bit rate compression. The encoders do not have to have identical GOP structures, that is, GOP boundaries can occur in each encoder at different times. Due to the different GOP structures of the encoders, in one embodiment a channel buffer and a corresponding buffer control feedback loop are incorporated into a system in accordance with the present invention. At scene changes, quick reactions are assured by changing GOP structures dynamically and allowing adequate bit rate changes. The present system/method may be implemented using, for example, International Business Machines' single chip MPEG-2 video encoders, part number IBM39 MPEGS422 PBA 17C.

Section 1 below describes a multi-program video compression system in accordance with the present invention. The joint rate control strategy of this invention is then presented in detail in Section 2. The strategy for joint rate control in the case of scene change is described in Section 3. Channel buffer size and feedback control are summarized in Section 4. Section 5 presents an integrated rate control, statistical multiplex system. Rate control at picture boundaries is discussed in Section 6.

1. Multi-program Video Compression System

Figure 3:
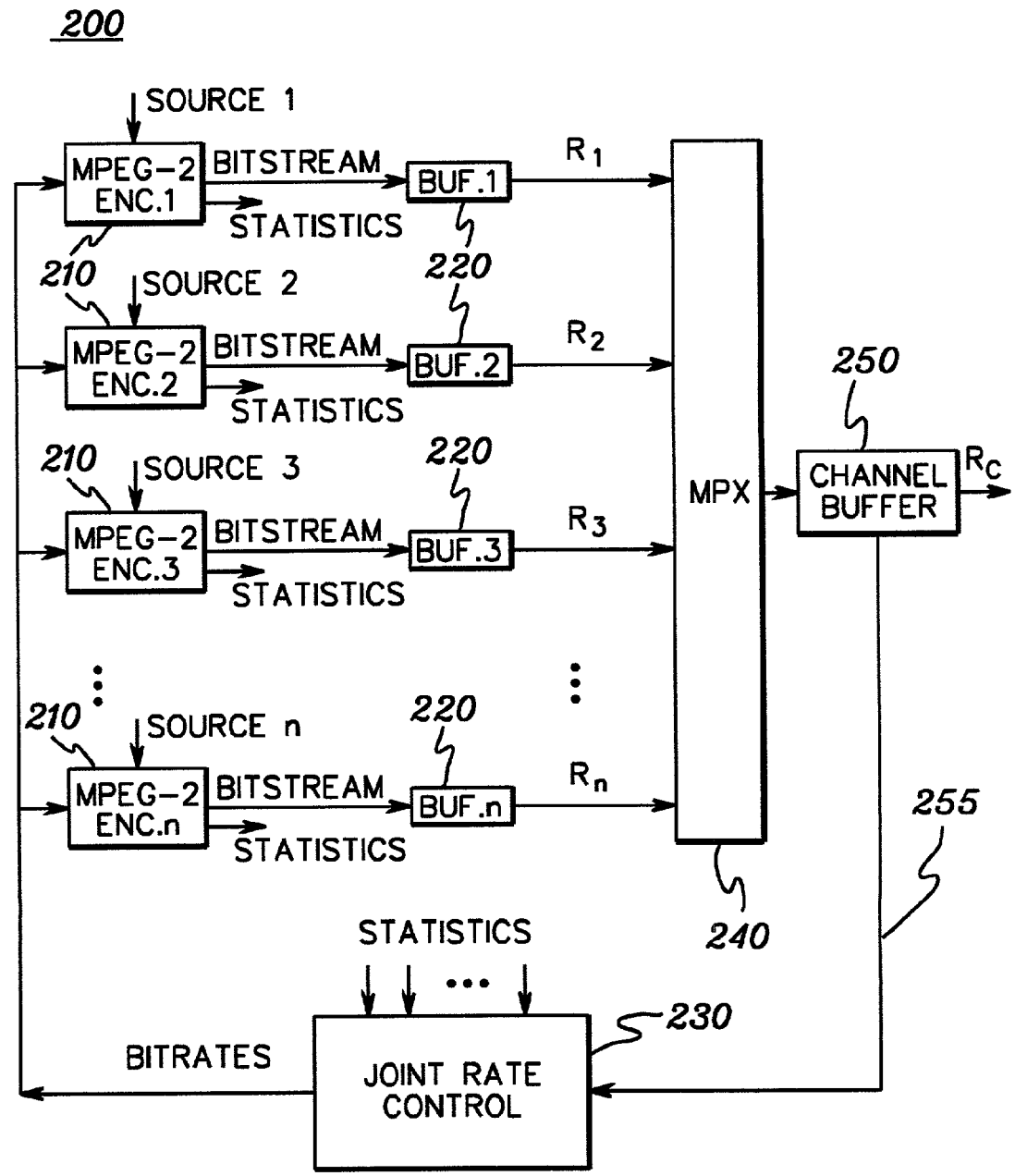
FIG. 3 depicts an example of a multi-stream video compression stat-mux system which may be implemented in accordance with one aspect of the present invention.

FIG. 3 shows a multi-program video compression system 200 to encode several programs (Source 1, Source 2, ... Source n) in parallel using the feedback approach of the present invention. The example system 200 consists of several MPEG-2 video encoders 210, individual buffers 220 connected to the encoders 210, a joint rate controller 230, a multiplexer 240, and a channel buffer 250. Each encoder generates statistics about the picture that has just been encoded. These statistics are input parameters to the joint rate control algorithm 230, which calculates the bit rate of each individual encoder dynamically as described herein below.

In the proposed system 200 the bit rate of each encoder 210 is determined based on the relative complexities of the programs (Source 1, Source 2 ... Source n), and upon occurrence of a scene change inside the corresponding program. The encoders preferably produce bitstreams compatible with the MPEG-2 standard. No additional preprocessing of the input sources is required, with the exception of scene change detection, which can be conventionally done either inside or outside of the encoders 210. Each encoder changes its bit rate at GOP boundaries or at scene changes according to the joint rate control 230. This allows the encoders to operate at a constant bit rate (CBR) inside the GOPs using the CBR video buffer verifier model according to the MPEG-2 standard. Overall, this strategy results in a piece-wise constant, but still variable bit rate compression.

The encoding of video sources is not restricted to having identical GOP structures or GOP lengths in each encoder. Since GOP boundaries can occur in each encoder at different times and bit rate changes take effect only at GOP boundaries, channel buffer 250 is employed to compensate possible overflow or underflow of the channel rate. A channel buffer control feedback 255 is also incorporated into the joint rate control algorithm 230 in order to prevent channel buffer 250 overflow or underflow.

In addition to the following description, the joint rate control strategy, determination of the minimum size of the channel buffer, and the corresponding channel buffer control are discussed in more detail in the above-incorporated U.S. patent application entitled "Control Strategy For Dynamically Encoding Multiple Streams of Video Data in Parallel For Multiplexing Onto A Constant Bit Rate Channel", by Boroczky et al., U.S. Ser. No. 09/087,603.

2. Joint Rate Control

The joint rate control strategy presented herein is based on a feedback concept wherein statistics produced by the encoders (along with the compressed bitstream) are fed into the joint rate controller 230, together with the information on channel buffer 250 fullness. The bit rate of a program being encoded is assumed proportional to the ratio between the complexity of that program and the sum of the complexities of all programs being encoded in parallel:

$$R_i = R_c \cdot X_i \bigg/ \left( \sum_i X_i \right), \quad (1)$$

where $R_i$ is the bit rate of program i, $R_c$ is the channel rate and $X_i$ is the complexity of program i.

Determination of picture complexity is based on the used bit production model that is similar to the one suggested in MPEG-2 Test Model 5 (See ISO/IEC JTCI/SC29/WG11 N0400, "Test Model 5," April, 1993):

$$b_j = \frac{c_j}{Q_j}, \quad (2)$$

where the model parameter $c_j$ is such that to produce a target number of bits $b_j$ in a picture, a certain quantization scale $Q_j$ has to be set. Based on Equation (2), the bit rate of program i can be calculated for a time interval of displaying a GOP as:

$$R_i = \frac{\sum_j (C_{ij}/Q_{ij})}{N_i / f_i}, \quad (3)$$

where $c_{ij}$ is the bit production model parameter for picture j, $Q_{ij}$ is the quantization parameter for picture j, $N_i$ is the number of pictures in a GOP, and $f_i$ is the frame rate of program i. In a stat-mux system, the goal is to distribute the channel bandwidth among the programs such that:

$$\sum_i R_i \leq R_c \quad (4)$$

To achieve the goal of equalizing the picture quality of all programs, an ideal quantization parameter can be derived using Equations (3) and (4):

$$Q_{ideal} = \frac{1}{R_c} \cdot \sum_i \left( (f_i/N_i) \cdot \sum_j c_{ij} \right) \quad (5)$$

This ideal quantization parameter can result in equal picture quality for all pictures in each program. Using $Q_{ideal}$ in Equation (3), the bit rate of each program is calculated as:

$$R_i = R_c \cdot \left[ (f_i/N_i) \cdot \sum_j c_{ij} \right] / \left[ \sum_i \left( (f_i/N_i) \cdot \sum_j c_{ij} \right) \right] \quad (6)$$

In a stat-mux system in accordance with this invention, $c_{ij}$ is equal to $b_{ij} \cdot Q_{ij}$, where $b_{ij}$ is bits used for encoding a picture and $Q_{ij}$ is the average quantization parameter. Furthermore, the complexity of a program is estimated as the average of the picture complexities using a sliding window of the GOP size.

Due to the relationship of the program complexities, bit rate changes may occur in a program at any of the GOP boundaries, even if a scene change did not take place in that program. If bit rate changes are too abrupt in a program with no scene cut, the picture quality may vary from GOP to GOP significantly, even if the total quality of the system is improved. To prevent this situation, the bit rate changes will be limited on GOP boundaries, but not at scene changes, where no restrictions are preferably imposed. For example, 10% changes relative to the previous bit rate at the GOP boundaries might be allowed if no scene change occurs. If a scene cut takes place, then there is no limitation on bit rate changes.

3. Joint Rate Control at Scene Changes

In a stream of video data, scene changes can occur at any time. They may happen at any picture type and at any GOP position. In the above discussion, it has been assumed that bit rate changes will be effective only at GOP boundaries and the encoders run in constant bit rate (CBR) mode inside the GOPs. A drawback to this approach is that the strategy prevents a quick reaction of the system to complexity changes of the programs. To overcome this problem, special processing is preferably employed in scene change situations.

Figure 4:
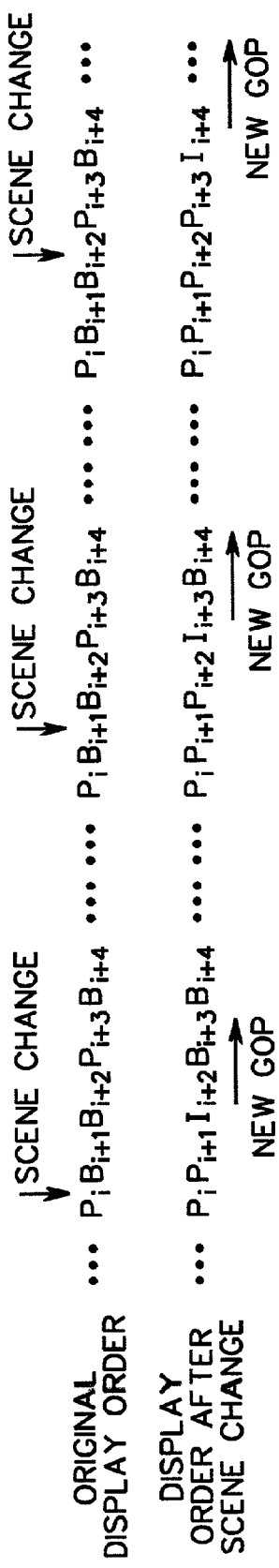
FIG. 4 is an example of group of picture structure changes at scene changes in accordance with the present invention.

Scene change detection analysis is carried out between consecutive pictures of each program, either inside the encoders or externally, so that a scene change is known prior to encoding the first picture in a new scene. If a scene change occurs, the current GOP will be finished prematurely. In one embodiment, the first picture in the new-scene is encoded as the last picture of the prematurely-finished GOP and its statistics are then used to predict the complexity of the new scene, and consequently to calculate the bit rate for the subsequent GOP using Equation (6). FIG. 4 shows an example of original GOP structures, along with new ones if scene changes occur. Three cases are distinguished depending at which picture type the scene change takes place.

The prediction of the new-scene complexity is based on empirically determined relative complexities of different picture types. If the first picture of the new-scene, which is the last picture of the finishing GOP, is a P picture and every macroblock is encoded as intra, then the complexity of this picture is considered as an I complexity. Based on this I complexity the average complexity of the new scene, $X_i$, is estimated as:

$$X_i = \frac{X_I \cdot (1 + r_P \cdot n_P + r_B \cdot n_B)}{N_i / f_i}, \quad (7)$$

where $X_I$ is the complexity of the I picture, $n_P$, $n_B$ are the number of P and B pictures in a GOP, and $r_P$, $r_B$ are the ratio of the P and B picture complexities with respect to the I picture complexity, respectively. Typical values of $r_P$ and $r_B$ are 0.5 and 0.25, respectively. The complexity $X_i$ is used in Equation (6) for the bit rate calculation. As more pictures are encoded in the new GOP, the complexity is preferably updated continuously by applying the actual bits used and average quantization parameters used to encode the pictures. As encoding of the GOP continues, the prediction of the complexity of the new scene will change by using the actual coding statistics.

Previously it was stated that the encoders are running in CBR mode inside the GOPs and that each encoder uses a CBR video buffer verifier model. No buffer under- or overflow is allowed. For example, a goal in the CBR rate control algorithm may be to ensure that buffer fullness at the end of the GOP will be the same as the initial buffer fullness (e.g. 80% of the buffer size). This may not always be the case, however, due to mismatch of the target bit budget and of the actual bits used per picture. Because of the over- or underproduction of bits in a GOP, the buffer fullness will be under or over the initial level, respectively. A considerably large buffer fullness error can accumulate. This error is carried over and tried to be compensated for in the next GOP. This rate control works fine if little or no bit rate changes take place at GOP boundaries. If bit rate changes are abrupt, however, such as at scene changes, a buffer fullness error (BFE) strategy in accordance with the present invention is applied to further improve the picture quality.

If scene change occurs, the buffer fullness error is considered to be zero at the beginning of the new GOP after a scene change. To prevent under- or overflow of the buffers connected to each encoder, the bit rate calculated by Equation (6) is modified as:

$$R_{imod} = R_i + E \cdot f_i / N_i, \quad (8)$$

where $R_i$ is the calculated bit rate for program i according to Equation (6), E is the buffer fullness error bits, $N_i$ is the number of pictures in a GOP and $f_i$ is the frame rate for program i. The bit rate of the program will be increased if the buffer fullness error is positive (the buffer fullness in the beginning of the GOP was less than the initial), or it will be decreased if E is negative. For rate control inside the GOP, the initial buffer fullness is considered as the buffer fullness at the end of the previous GOP instead of using, for e.g., 80% of the buffer size. The BFE strategy results in enhanced picture quality after scene changes.

4. Channel Buffer Size and Feedback Control

Channel buffer size and feedback control are described in detail in the above-incorporated U.S. patent application Ser. No. 09/087,603. Encoders employed in a multi-program video compression system in accordance with the principles of the present invention should be capable of ascertaining and sharing the necessary statistics required by a joint rate control algorithm such as discussed above. Encoders should also have the ability to change bit rates at GOP boundaries. To further exploit the advantages of the present invention, in the event of a scene change, encoders should be able to change GOP structure dynamically, provide quantities for calculating the buffer fullness error and carry out scene change detection and reaction either internally or externally.

5. Integrated Stat-mux System

Features needed for a statistical multiplex (stat-mux) system are joint rate control and a system buffer. As noted above, the function of a joint rate controller is to partition the channel rate among the several encoders in the system. The joint rate controller requires information from and dispatches controls to all encoders. Typical information collected from each encoder includes input picture content and output picture usage. Input picture content may be represented by input picture statistics such as inter-pixel differences and frame activity. Encoder usage may be represented by output statistics such as encode bit count and average quantization level. Typical controls dispatched to the individual encoders include bit rate changes, which may take place at specific encoding boundaries such as the beginning of a picture of GOP. In this section, an architecture which allows the encoders themselves to perform the functions of a master joint rate controller and system buffer is presented, thus simplifying and economizing the design of the system by eliminating the need for extra components.

Figure 5:
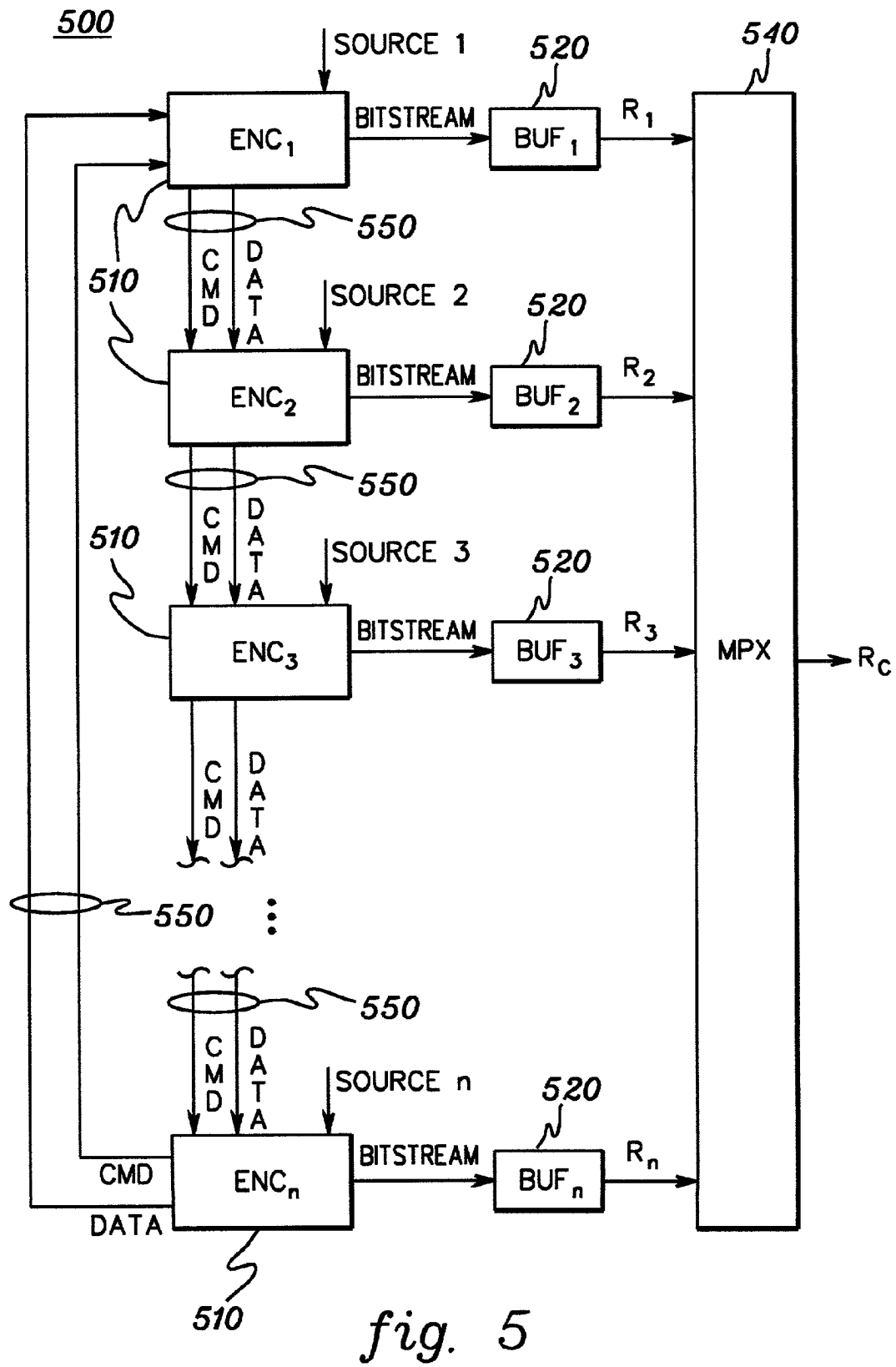
FIG. 5 is an example of an integrated rate control, statistical multiplex system in accordance with another aspect of the present invention.

FIG. 5 depicts one architectural embodiment of an integrated rate control, statistical multiplex (stat-mux) system in accordance with the principles of the present invention.

This system employs a distributed joint rate control function in conjunction with an exchange interface to handle the joint rate control for the statistical multiplexer. Integrated stat-mux system 500 shown in FIG. 5 comprises a multi-program video compression system for encoding several programs (source 1, source 2, source 3, . . . source n) in parallel using the shared statistics approach of the present invention. System 500 includes several MPEG-2 video encoders 510, their individual buffers 520 and a multiplexer 540. Each encoder generates statistics about the picture that has just been encoded and shares those statistics with the other encoders of the system using an exchange interface 550. The statistics comprise input parameters for the distributed joint rate control algorithm which in this example is resident on the individual encoders 510. The joint rate control algorithm calculates the bit rate of the individual encoders dynamically such as described above. Output from multiplexer 540 is a concatenated stream of compressed video data having a constant channel rate $R_c$.

In the embodiment of FIG. 5, the exchange interface 550 comprises a communication bus which includes (in this example) a command bus and a data bus. The exchange interface allows the encoders to send and receive input or output statistics concerning encoding of their respective video sources. This exchange interface allows the individual encoders 510 to have integrated functions previously performed by the joint rate controller in the embodiment of FIG. 3.

Figure 6:
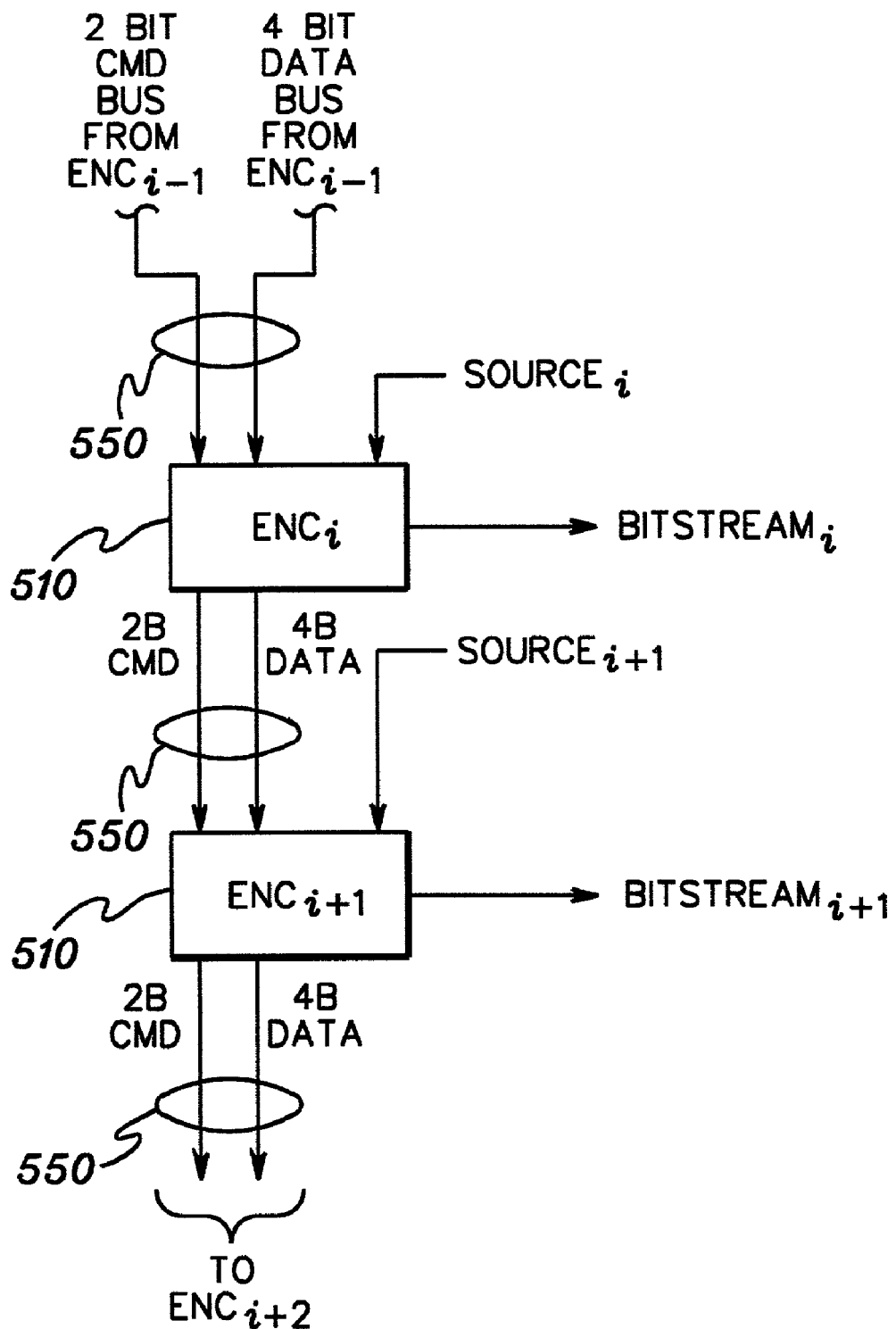
FIG. 6 illustrates one embodiment of a bus structure between two adjacent encoders i, i+1 of a stat-mux system in accordance with the principles of the present invention.

As one bus structure example, FIG. 6 depicts a communication bus between two adjacent encoders ($ENC_i$, $ENC_{i+1}$) for an integrated rate control, stat-mux system. In this example, the communication bus between the encoders is shown to comprise a two bit command bus and a four bit data bus.

As each input picture is received by an encoder, the input statistics can be calculated and used to indicate the image content as $I_{ij}$. Each input statistic of a respective encoder is saved for later use and is shared among the other encoders in the integrated system. In one embodiment, with the exception of the first and last encoders of the system (which are discussed below with reference to FIG. 7), the input statistics of each encoder are added to the input statistics of the previous encoder prior to sending to the next encoder. These input statistics are transferred on the four bit data bus in the example of FIG. 6. A specific command code (for example X3) is used to indicate the presence of an interim statistic on the data bus which is to be summed. This command code in the example of FIG. 6 is a two bit command code placed on the command bus of the exchange interface.

Figure 7:
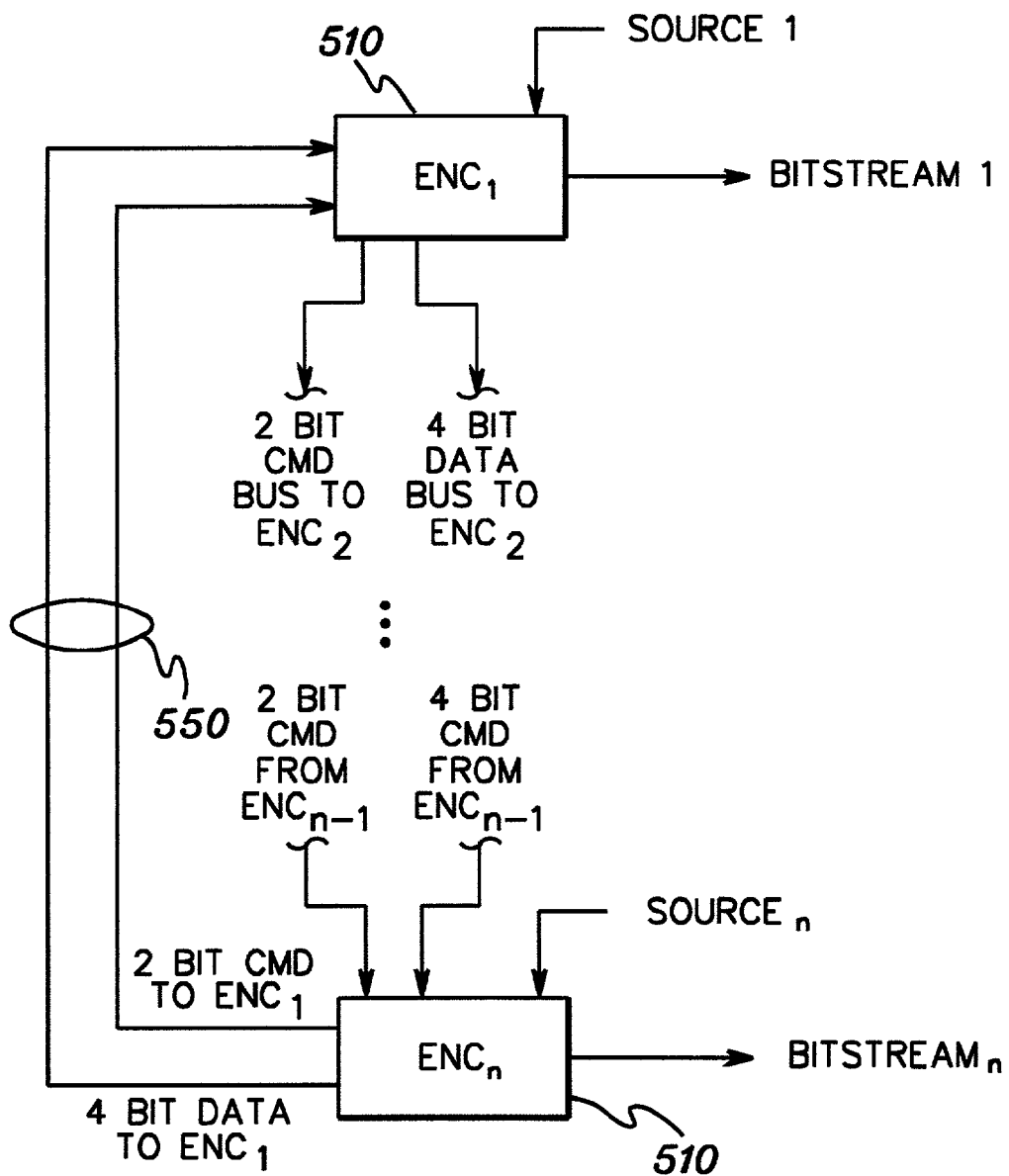
FIG. 7 illustrates one embodiment of a bus structure between a first encoder ($ENC_1$) and a last encoder ($ENC_n$) in an integrated rate control, statistical multiplex system in accordance with the present invention.

FIG. 7 depicts an example bus structure between a first encoder ($ENC_1$) and a last encoder ($ENC_n$) in an integrated stat-mux system in accordance with the present invention. These encoders again comprise encode systems as described above in connection with FIGS. 5 & 6. An exchange interface 550 is employed to send commands and data from the last encoder back to the first encoder. Again, the exchange interface comprises a four bit data bus and a two bit command bus in this example.

The input statistic(s) calculated in the last encoder will represent the total input statistic $I_{tj}$ in the system, which is to be delivered to all encoders in a sequential, circular fashion. Thus, the last encoder sends $I_{tj}$ to the first encoder with a specific command code, (for example X2), indicating that the total input statistic at time j is on the data bus. Encoder 1 then sends this total statistic $I_{tj}$ to encoder 2, and the transfer of the total statistic continues in the system until the statistic is received back by the last encoder, where the process ends. When this exchange is complete, each encoder has both its individual statistic $I_{ij}$ and the total statistic $I_{tj}$ at time j, which will allow each encoder to perform rate control.

To summarize, during a first daisy chain pass of the multiple encoders, the individual input statistics for the encoders are being summed. Once a summed total has been reached, the total statistic(s) is then daisy chained to each of the encoders in the system such that each encoder has its own individual input statistic value and the total value and from this information is able to employ a rate control function, such as a simple proportion, in order to select its individual bit rate for output to the constant bit rate channel. For example, if an encoder sees that the complexity of its source video is 25% of all the video streams encoded, then that encoder is able to employ 25% of the total bit rate for the constant channel.

When a scene change is detected, the distributed joint rate control function in an encoder can allocate a portion of the channel rate as its bit budget by the ratio $R(I_{ij}/I_{tj})$, where R is the constant channel rate, $I_{ij}$ is the input statistics of encoder i, and $I_{tj}$ is the total input statistics of all encoders at time j. The bit rate can also be changed on a change boundary, such as a picture or GOP boundary, even when there is no scene change. However, the change may be limited to preventing large variants in output quality.

A bit budget calculation may be further refined by the encoder bit usage as encoding progresses. For example, output statistics such as picture bits used and average quantization level, may be used to indicate encoder bit usage. These output statistics can also be shared among the encoders in the system, similar to the sharing of the input statistics. The exchange interface described herein allows the encoders in the stat-mux system to share any statistical information with each other. Based on the shared information, encoding control is determined by the distributed joint rate controller of each encoder. This mechanism eliminates the need for an external joint rate control system.

Figure 8B:
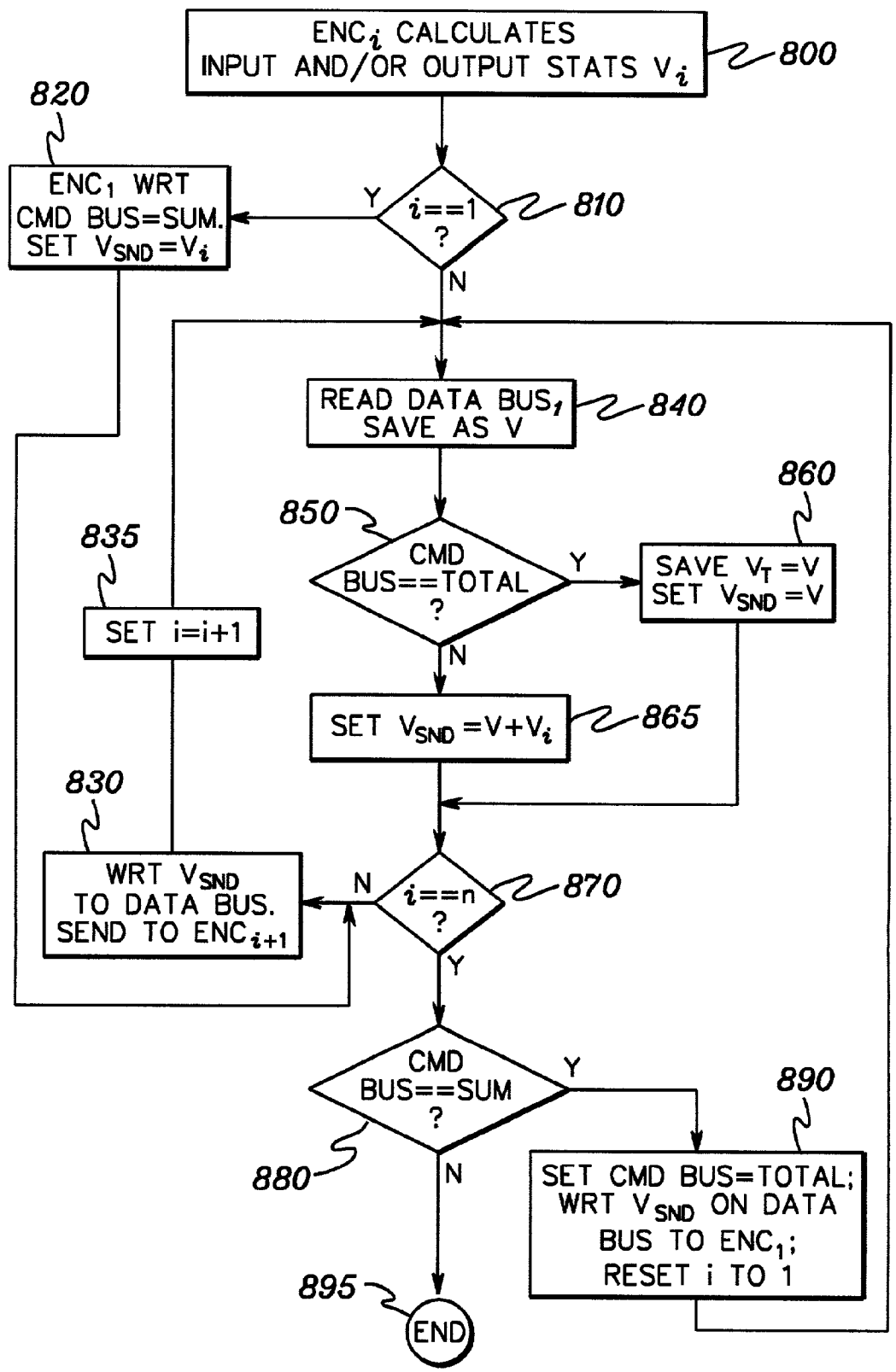
FIG. 8B is one flowchart embodiment of a process for sharing at least one input statistic or output statistic between multiple encoders employing an exchange interface in accordance with the principles of the present invention.

FIG. 8A presents a key for the variables employed in the flowchart embodiment of FIG. 8B, which depicts one process embodiment for passing statistics around an integrated stat-mux system in accordance with the principles of the present invention.

Input and/or output statistics $V_i$ are initially calculated 800 based on the video stream of data received and being encoded. Each encoder $ENC_i$ determines whether it is designated as the first encoder in the system 810. If "yes", then the encoder ($ENC_1$) assigns the summation command to the command bus and sets the value written to the data bus as its own input and/or output statistics $V_i$. This value $V_{snd}$ is then written to the data bus and sent to the next encoder in the system ($ENC_{i+1}$). The next encoder is selected by setting i=i+1 835.

At the next encoder, data is read from the data bus and saved as variable V 840. This encoder then determines whether the command bus indicates that the saved data comprises a total statistic 850. If not, then the value this encoder writes to the data bus for transmission to the next encoder is the read value V plus its own input and/or output statistics $V_i$. If the command bus indicates that the read value is a total statistic value, then the encoder saves the read value as a total value ($V_T$) and sets the value to be written to the data bus for transmission to the next encoder as the read value (i.e., set $V_{SND}$=V).

This encoder then determines whether it is the last encoder in the system 870. If not, then the value of $V_{SND}$ is written to the data bus and sent to the next encoder 830. This loop repeats until i is equal to n meaning that the last encoder has been reached.

At the last encoder, inquiry is made whether the command bus is set to summation. If not, meaning that the total statistic has just traversed the entire system, processing ends 895. If the command bus is set to the summation statistic command, then the last encoder resets the command bus to the total statistic command, writes $V_{SND}$ from the data bus to the first encoder ($ENC_1$), and resets i to one 890.

Figure 9:
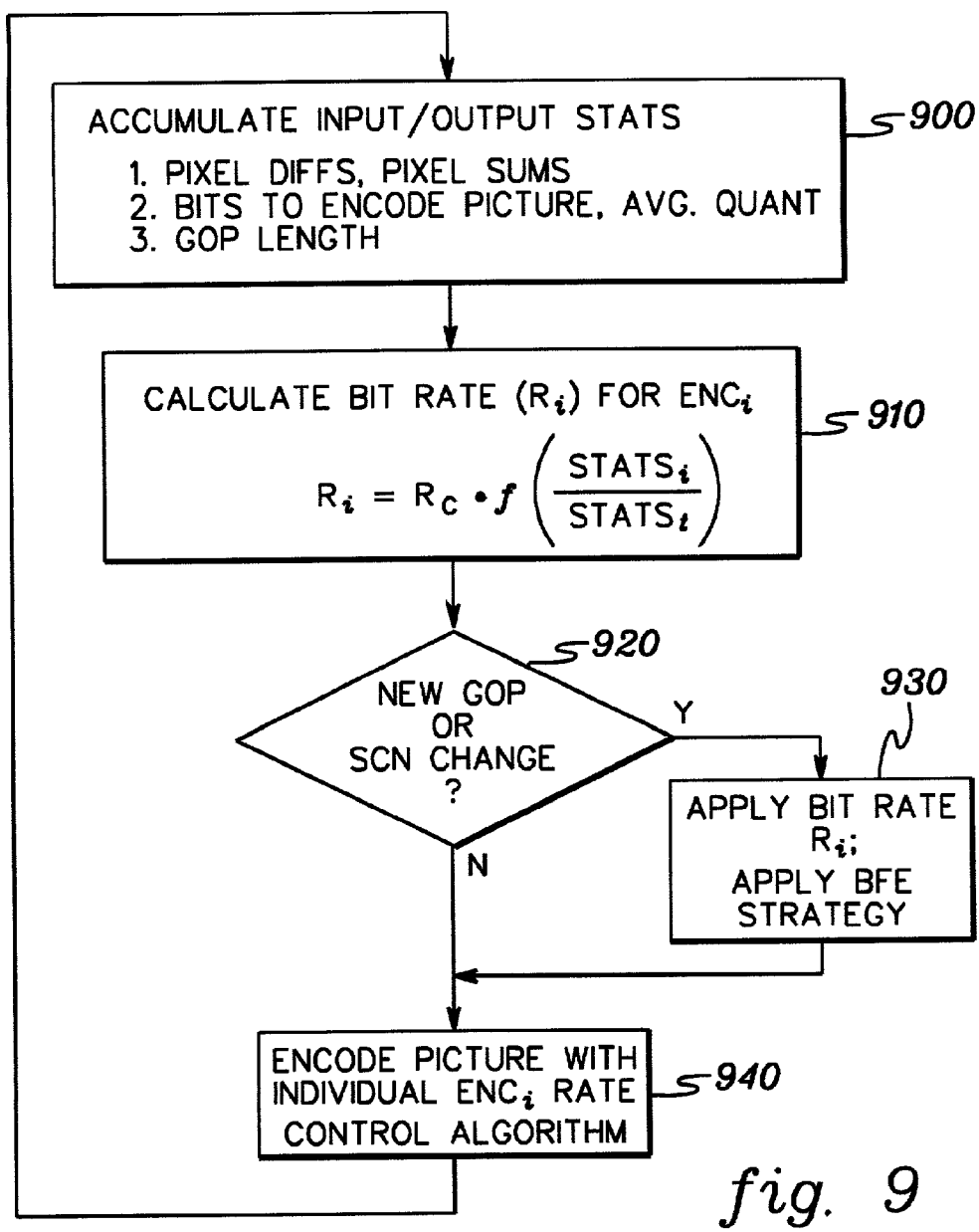
FIG. 9 is a flowchart of one embodiment of rate control within an integrated rate control, statistical multiplex system in accordance with the present invention.

FIG. 9 is a flowchart of one rate control embodiment for employing input and/or output statistics accumulated at the individual encoders in the system. Processing begins by accumulating the desired input/output statistics 900. By way of example, these statistics may include pixel difference values, pixel summations, bits to encode a picture, average quant and GOP length. A bit rate ($R_i$) for an encoder ($ENC_i$) is calculated 910. The bit rate for encoder i will comprise the constant channel bit rate ($R_c$) times a function of the input/output statistics for encoder i relative to the total value of the input/output statistics for all encoders of the system.

If coordinating rate changes on a group of picture or scene change boundary, processing determines whether a new GOP or scene change has occurred 920. If so, then the bit rate $R_i$ is applied, as well as a buffer error strategy (BFE) 930, such as described above. Each respective video stream is then encoded with the individual encoder's rate control algorithm 940.

In one embodiment of a stat-mux system in accordance with the present invention, the encoders in the system have different GOP structures. Therefore, the GOP boundary of an encoder may not align with the GOP boundaries of its neighboring encoders. In addition, the encoders may have different input picture start times, thus the picture boundaries of an encoder may not align with the picture boundaries of its neighboring encoders. When bit rate changes occur in an encoder, an instantaneous system overflow or underflow condition may exist. Over a period of time, however, this system will compensate itself, correcting the overflow/underflow. The length of this time period is a function of the bit rate change boundary. If the bit rate change is allowed to take place only at the start of a GOP, then the time period is calculated as the longest GOP encode time amongst all encoders in the system.

Figure 10:
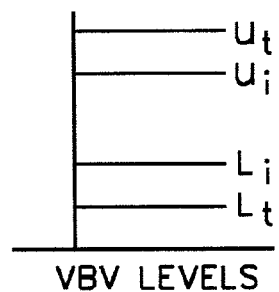
FIG. 10 illustrates upper and lower video buffer verifier (VBV) levels for an encoder buffer in an integrated rate control, statistical multiplex system in accordance with the principles of the present invention.

The output of each encoder in the system is regulated by the encoder's own video buffer verifier (VBV), as specified in the MPEG standard. When the bit rate of an encoder is changed, the encoder tries to balance its output based on its own buffer fullness level, instead of its neighboring encoder's. This tends to put unnecessary restrictions on the encoder output and limits its picture quality. In the architecture of the system of FIG. 5, the buffer associated with each encoder is modified to allow temporary overrun or underflow based on the total system environment. Thus, two additional buffer levels are added to the encoder's VBV as shown in FIG. 10. The symbol $U_i$ represents the upper bound and $L_i$ is the lower bound used by encoder i during normal encoding. $U_t$ is the upper bound and $L_t$ is the lower bound, used by encoder i during the first GOP when a new bit budget is allocated in the stat-mux system. The $U_t$ and $L_t$ represent the total system buffer level, allowing the individual encoder to over or under produce the constant channel rate. Actual values for $U_t$ and $L_t$ will be system dependent and can be readily set by the user or by on-chip microcode based on system parameters.

The buffer output rate for encoder i can be defined as:

$$B_{R_i} = \left[ \frac{B_{fiT}}{\sum_{i=1}^{n} B_{fiT}} \right] \cdot R_C, \quad (9)$$

wherein $B_{Ri}$=Buffer unload rate for encoder i;
$B_{fiT}$=Buffer fullness of encoder i at the completion of the last total statistics received by encoder i; and
$R_c$=Total channel rate.

At any instance in time, the amount of data unloaded from an individual encoder i is dependent upon the amount of data generated by encoder i divided by the total amount of data generated by all the encoders (including encoder i) multiplied by the total channel bit rate, $R_c$.

6. Rate Control at Picture Boundaries

As an alternative to making bit rate changes only on scene or GOP boundaries, bit rate changes can also occur at picture boundaries. That is, encoders do not have to begin and end encoding of their respective pictures at the same time. To accomplish this, a small restriction is required in that all encoders must be encoding at the same frame rate (e.g., 30 frames per second). This also means that there is no interlock between the daisy-chain transmission of statistics and the onset of picture encoding. That is, encoders do not have to wait until all statistics have been passed around before encoding may commence.

The steps involved in this process would be as follows:
1. Encoders receive picture (pixel) data, and upon receiving a full picture's worth, compute the input statistics (or output statistics) and send them to the next encoder.
2. These stats go onto the receiving encoder's stack, and when that encoder is available to do so, it reads the stack, adds its own stat values and sends these values to the next encoder, and so on. (Note: encoders that are in the stat-mux system, but are not encoding anything, must still pass on the values they receive, perhaps adding 0 to the received values, so as not to break the chain.)
3. If an encoder is ready to begin encoding (enough total pixel data has come in to the encoder), it simply uses that stat totals it has, which may be from a previous picture. Since all frame rates (pictures/second) are the same among all the encoders in the system, the largest delay or latency is 2 picture output times (actually just less than 2), so the oldest possible stat is one picture back.
4. Upon completion of a picture, each encoder sends its output statistics around and again begins encoding when its ready, not necessarily with the latest statistics.

To handle this, the encoder's buffer should be large enough to handle 2 pictures worth of encoded data. The formula for buffer size is:

$$Buf\ size = \left[ f_I \cdot \left( \frac{W_I}{\sum_{1}^{x} (W_T \cdot N_T)} \right) \right] \cdot B_{R_{C_1}}, \quad (10)$$

where:
$f_I$=Frequency of I pictures in 1 second of video
x=Frame rate (e.g., 30 frames/sec.)
$W_I$=Weighted ratio of bits allocated to I pictures vs P, B
$W_T$=Weighted ratio of bits allocated for each picture type
$N_T$=Number of pictures of each type in 1 second of video
$B_{RCf}$=Bits for 1 second of video at the channel bit rate By way of specific example, if a constant channel rate ($R_c$) is 16 mb/s, then one second's bits would total 16 megabits. If the bit allocation ratio is I:P:B=10:5:1, and if the GOP size is 15 at BBIBBPBBPBBPBBP, then the buffer size is:

$f_I$=2 (i.e., 2 I pictures in one second)
$W_I$=10
$W_T \cdot N_T$=(10·2)+(5·8)+(20·1)=80
$B_{RCf}$=16 mb
Buff Size =2(10/80) 16=4 mb=500 k bytes To summarize, the exchange interface provided herein allows multiple encoders to share a constant channel rate in a statistical multiplex system. The distributed joint rate control process described provides an effective system joint rate control without any external rate control processing. The modification of VBV in the encoder compensates output quality without limitation of individual buffer levels. The encoder architecture allows a compact, simple system, designed to accommodate the encoding of multiple concurrent programs.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:
1. A method of processing multiple streams of video frames comprising:
 employing multiple encode processes to encode multiple streams of video frames in parallel;
 directly exchanging encode process to encode process at least one input statistic or encode statistic employed by each encode process of the multiple encode processes;
 dynamically adapting encoding of at least one stream of video frames of the multiple streams of video frames based on relative complexity of the video frames comprising the multiple streams of video frames employing the at least one input statistic or encode statistic directly exchanged between the encode processes; and
 wherein said dynamically adapting comprising employing a joint rate control strategy distributed among said multiple encode processes, and wherein each encode process of said multiple encode processes ascertains said at least one input statistic or encode statistic for its respective stream of video frames being encoded, saves said at least one input statistic or encode statistic, and shares said at least one input statistic or encode statistic directly with said multiple encode processes during said exchanging to allow determination by at least one encode process of the multiple encode processes of a total statistic corresponding to a sum of the at least one input statistics or encode statistics generated by said multiple encode processes, and wherein said directly exchanging further comprises sharing the total statistic by the at least one encode process with the multiple encode processes, and responsive to obtaining of the total statistic, at least one encode process employs the total statistic and its own at least one input statistic or encode statistic during said dynamically adapting encoding to facilitate said dynamically adapting encoding of the at least one stream of video frames of the multiple streams of video frames.

2. The method of claim 1, further comprising providing an exchange interface within the multiple encode processes, wherein said exchange interface facilitates said directly exchanging encode process to encode process of said at least one input statistic or encode statistic.

3. The method of claim 2, wherein said employing comprises employing multiple encoders connected in parallel, each encoder implementing a respective encode process of said multiple encode processes, and wherein said providing the exchange interface includes providing dedicated data and control buses directly connecting the multiple encoders for facilitating said direct exchanging encode process to encode process of the at least one input statistic or encode statistic.

4. The method of claim 1, further comprising multiplexing resultant compressed video streams output by said multiple encode processes onto a constant bit rate channel.

5. The method of claim 4, wherein said distributed rate control strategy facilitates partitioning of said constant bit rate channel capacity among said multiple encode processes.

6. The method of claim 5, further comprising buffering output of each encode process of said multiple encode processes in a respective encode buffer prior to said multiplexing, and allowing expanded upper and lower bounds in at least one encode buffer when a new bit budget is allocated in its respective encode process, wherein an amount of data unloaded by each encode process from its respective encode buffer is a function of a total output of said multiple encode processes at any instance in time and said constant bit rate channel capacity.

7. The method of claim 1, wherein each encode process of said multiple encode processes employs the total statistic and its own at least one input statistic or encode statistic during said dynamically adapting encoding to dynamically adapt encoding of each stream of video frames.

8. The method of claim 7, wherein said dynamically adapting encoding comprises selecting at each encode process a bit rate of a compressed video stream output therefrom, said bit rate being selected using the total statistic and its own at least one input statistic or encode statistic.

9. The method of claim 1, wherein said dynamically adapting encoding comprises modifying a bit rate employed by at least one encode process of said multiple encode processes responsive to said at least one input statistic or encode statistic exchanged between the encode processes.

10. The method of claim 9, wherein said modifying the bit rate comprises modifying the bit rate of the at least one encode process at a group of picture boundary or scene change in the stream of video frames being encoded by said at least one encode process.

11. The method of claim 9, wherein said modifying a bit rate of the at least one encode process comprises modifying the bit rate of the at least one encode process at a picture boundary of the stream of video frames being encoded by said at least one encode process.

12. The method of claim 1, wherein said at least one input statistic or encode statistic comprises at least one of an inter-pixel difference statistic, a frame activity statistic, an encode bit count or a quantization level statistic.

13. A method of processing multiple streams of video frames comprising:
   encoding the multiple streams of video frames in parallel employing multiple encode processes, the encoding including employing at least one controllable encode parameter for each stream of video frames;
   during the encoding, analyzing each stream of video frames to derive information on at least one characteristic thereof, the at least one characteristic comprising at least one of an intraframe characteristic or an interframe characteristic;
   directly exchanging encode process to encode process the information derived on the at least one characteristic of each stream of video frames;
   dynamically adapting encoding of at least one stream of video frames using relative information on the at least one characteristic obtained from each stream of video frames of the multiple streams of video frames, the dynamically adapting including for the at least one stream of video frames adjusting the at least one controllable encode parameter employed in the encoding, wherein the encoding of each stream of video frames is dynamically adaptive to relative changes in the at least one characteristic obtained from the multiple streams of video frames by directly exchanging encode process to encode process the information on the at least one characteristic of the multiple streams of video frames; and
   wherein said dynamically adapting comprising employing a joint rate control strategy distributed among said multiple encode processes, and wherein each encode process of said multiple encode processes ascertains said at least one input statistic or encode statistic for its respective stream of video frames being encoded, saves said at least one input statistic or encode statistic, and shares said at least one input statistic or encode statistic directly with said multiple encode processes during said exchanging to allow determination by at least one encode process of the multiple encode processes of a total statistic corresponding to a sum of the at least one input statistics or encode statistics generated by said multiple encode processes, and wherein said directly exchanging further comprises sharing the total statistic by the at least one encode process with the multiple encode processes, and responsive to obtaining of the total statistic, at least one encode process employs the total statistic and its own at least one input statistic or encode statistic during said dynamically adapting encoding to facilitate said dynamically adapting encoding of the at least one stream of video frames of the multiple streams of video frames.

14. The method of claim 13, further comprising providing an exchange interface within the multiple encode processes, wherein said exchange interface facilitates said directly exchanging encode process to encode process of said information derived on the at least one characteristic of each stream of video frames.

15. The method of claim 13, further comprising multiplexing resultant compressed video streams output by said multiple encode processes onto a constant bit rate channel, and wherein said distributed rate control strategy facilitates partitioning of said constant bit rate channel capacity among said multiple encode processes.

16. The method of claim 13, wherein said at least one controllable encode parameter comprises a bit rate employed by at least one encode process of said multiple encode processes.

17. A system for processing multiple streams of video frames comprising:
    multiple encoders for encoding the multiple streams of video frames in parallel, each encoder receiving one stream of video frames of said multiple streams of video frames;
    a direct exchange interface providing encoder to encoder communications paths between said multiple encoders and allowing said multiple encoders to directly exchange the at least one input statistic or encode statistic therebetween;
    a distributed joint rate control means integrated within said multiple encoders for dynamically adapting encoding of at least one stream of video frames of the multiple streams of video frames based on relative complexity of the video frames comprising the multiple streams of video frames; and
    wherein each encoder ascertains said at least one input statistic or encode statistic for its respective stream of video frames being encoded, saves said at least one input statistic or encode statistic, and shares said at least one input statistic or encode statistic among said multiple encoders using said direct exchange interface to allow determination by at least one encoder of the multiple encoders of a total statistic corresponding to a sum of the at least one input statistics or encode statistics generated by said multiple encoders, and wherein said direct exchange interface facilitates encoder to encoder sharing of the total statistic, wherein at least one encoder employs the total statistic and its own at least one input statistic or encode statistic to dynamically adapt encoding of the at least one stream of video frames of the multiple streams of video frames.

18. The system of claim 17, wherein the direct exchange interface includes dedicated data and control buses directly connecting the multiple encoders for facilitating encoder to encoder exchanging of the at least one input statistic or encode statistic.

19. The system of claim 17, further comprising a multiplexer for multiplexing resultant compressed video streams output by said multiple encoders onto a constant bit rate channel.

20. The system of claim 19, wherein said distributed rate control strategy facilitates partitioning of said constant bit rate channel capacity among said multiple encoders.

21. The system of claim 20, further comprising means for buffering output of each encoder of said multiple encoders in a respective encode buffer prior to said multiplexer, and for allowing expanded upper and lower bounds in at least one encode buffer when a new bit budget is allocated in its respective encoder, wherein an amount of data unloaded by each encoder from its respective encode buffer is a function of a total output of said multiple encoders at any instance in time and said constant bit rate channel capacity.

22. The system of claim 17, wherein each encoder of said multiple encoders employs the total statistic and its own at least one input statistic or encode statistic to dynamically adapt encoding of its stream of video frames.

23. The system of claim 22, wherein said dynamically adapting encoding comprises selecting at each encoder a bit rate of a compressed video stream output therefrom, said bit rate being selected using the total statistic and its own at least one input statistic or encode statistic.

24. The system of claim 17, wherein said dynamically adapting encoding comprises modifying a bit rate employed by at least one encoder of said multiple encoders responsive to said at least one input statistic or encode statistic exchanged between the encode processes.

25. The system of claim 24, wherein said modifying the bit rate comprises modifying the bit rate of the at least one encoder at a group of picture boundary or scene change in the stream of video frames being encoded by said at least one encoder.

26. The system of claim 24, wherein said modifying the bit rate of the at least one encoder comprises modifying the bit rate of the at least one encoder at a picture boundary of the stream of video frames being encoded by said at least one encoder.

27. The system of claim 17, wherein said at least one input statistic or encode statistic comprises at least one of an inter-pixel difference statistic, a frame activity statistic, an encode bit count or a quantization level statistic.

28. A system for processing multiple streams of video frames comprising:
    multiple encoders for encoding multiple streams of video frames in parallel, each encoder employing at least one controllable encode parameter for encoding one stream of the video frames;
    means for analyzing each stream of video frames to derive information on at least one characteristic thereof, said at least one characteristic comprising at least one of an intraframe characteristic or an interframe characteristic;
    a direct exchange interface comprising an encoder to encoder communications bus interconnecting said multiple encoders and allowing said encoders to directly exchange information derived on the at least one characteristic of each stream of video frames;
    means for dynamically adapting encoding of at least one stream of video frames using relative information on the at least one characteristic obtained from each stream of video frames of the multiple streams of video frames, the dynamically adapting including for the at least one stream of video frames adjusting the at least one controllable encode parameter employed in the encoding, wherein the encoding of each stream of video frames is dynamically adaptive to relative changes in the at least one characteristic obtained from the multiple streams of video frames by directly exchanging encoder to encoder the information on the at least one characteristic of the multiple streams of video frames, and wherein the means for dynamically adapting encoding comprises a distributed means integrated within each of the multiple encoders; and
    wherein said means for dynamically adapting encoding comprises means for employing a joint rate control strategy distributed within said multiple encoders, and wherein each encoder of said multiple encoders ascertains said state information derived on the at least one characteristic of its respective stream of video frames, saves said information, and shares said information among said multiple encoders using said exchange interface to allow determination by at least one encoder of the multiple encoders of a total statistic corresponding to a sum of the information derived on the at least one characteristic by each encoder of the multiple encoders, and wherein said direct exchange interface further comprises means for sharing the total statistic among the multiple encoders, wherein at least one encoder employs the total statistic and its own information during the dynamically adapting encoding to facilitate said dynamically encoding of the at least one stream of video frames of the multiple streams of video frames.

29. The system of claim 28, further comprising means for multiplexing resultant compressed video streams output by said multiple encoders onto a constant bit rate channel, and wherein said distributed rate control strategy facilitates partitioning of said constant bit rate channel capacity among said multiple encoders.

30. The system of claim 28, wherein said at least one controllable encode parameter comprises a bit rate employed by at least one encoder of said multiple encoders.

31. At least one program storage device readable by a machine, tangibly embodying at least one program of instructions executable by the machine to perform a method of processing multiple streams of video frames, comprising:

employing multiple encode processes to encode multiple streams of video frames in parallel;

directly exchanging encode process to encode process at least one input statistic or encode statistic employed by each encode process of the multiple encode processes;

dynamically adapting encoding of at least one stream of video frames of the multiple streams of video frames based on relative complexity of the video frames comprising the multiple streams of video frames employing the at least one input statistic or encode statistic directly exchanged between the encode processes; and wherein said dynamically adapting comprising employing a joint rate control strategy distributed among said multiple encode processes, and wherein each encode process of said multiple encode processes ascertains said at least one input statistic or encode statistic for its respective stream of video frames being encoded, saves said at least one input statistic or encode statistic, and shares said at least one input statistic or encode statistic directly with said multiple encode processes during said exchanging to allow determination by at least one encode process of the multiple encode processes of a total statistic corresponding to a sum of the at least one input statistics or encode statistics generated by said multiple encode processes, and wherein said directly exchanging further comprises sharing the total statistic by the at least one encode process with the multiple encode processes, and responsive to obtaining of the total statistic, at least one encode process employs the total statistic and its own at least one input statistic or encode statistic during said dynamically adapting encoding to facilitate said dynamically adapting encoding of the at least one stream of video frames of the multiple streams of video frames.

32. The at least one program storage device of claim 31, further comprising providing an exchange interface within the multiple encode processes, wherein said exchange interface facilitates said directly exchanging encode process to encode process of said at least one input statistic or encode statistic.

33. The at least one program storage device of claim 32, further comprising multiplexing resultant compressed video streams output by said multiple encode processes onto a constant bit rate channel.

34. The at least one program storage device of claim 33, wherein said distributed rate control strategy facilitates partitioning of said constant bit rate channel capacity among said multiple encode processes.

35. The at least one program storage device of claim 34, further comprising buffering output of each encode process of said multiple encode processes in a respective encode buffer prior to said multiplexing, and allowing expanded upper and lower bounds in at least one encode buffer when a new bit budget is allocated in its respective encode process, wherein an amount of data unloaded by each encode process from its respective encode buffer is a function of a total output of said multiple encode processes at any instance in time and said constant bit rate channel capacity.

36. The at least one program storage device of claim 31, wherein each encode process of said multiple encode processes employs the total statistic and its own at least one input statistic or encode statistic during said dynamically adapting encoding to dynamically adapt encoding of each stream of video frames.

37. The at least one program storage device of claim 36, wherein said dynamically adapting encoding comprises selecting at each encode process a bit rate of a compressed video stream output therefrom, said bit rate being selected using the total statistic and its own at least one input statistic or encode statistic.

38. The at least one program storage device of claim 31, wherein said dynamically adapting encoding comprises modifying a bit rate employed by at least one encode process of said multiple encode processes responsive to said at least one input statistic or encode statistic exchanged between the encode processes.

39. The at least one program storage device of claim 38, wherein said modifying the bit rate comprises modifying the bit rate of the at least one encode process at a group of picture boundary or scene change in the stream of video frames being encoded by said at least one encode process.

40. The at least one program storage device of claim 38, wherein said modifying a bit rate of the at least one encode process comprises modifying the bit rate of the at least one encode process at a picture boundary of the stream of video frames being encoded by said at least one encode process.

41. The at least one program storage device of claim 31, wherein said at least one input statistic or encode statistic comprises at least one of an inter-pixel difference statistic, a frame activity statistic, an encode bit count or a quantization level statistic.

42. At least one program storage device readable by a machine, tangibly embodying at least one program of instructions executable by the machine to perform a method of processing multiple streams of video frames, comprising:

encoding the multiple streams of video frames in parallel employing multiple encode processes, the encoding including employing at least one controllable encode parameter for each stream of video frames;

during the encoding, analyzing each stream of video frames to derive information on at least one characteristic thereof, the at least one characteristic comprising at least one of an intraframe characteristic or an interframe characteristic;

directly exchanging encode process to encode process the information derived on the at least one characteristic of each stream of video frames;

dynamically adapting encoding of at least one stream of video frames using relative information on the at least one characteristic obtained from each stream of video frames of the multiple streams of video frames, the dynamically adapting including for the at least one stream of video frames adjusting the at least one controllable encode parameter employed in the encoding, wherein the encoding of each stream of video frames is dynamically adaptive to relative changes in the at least one characteristic obtained from the multiple streams of video frames by directly exchanging encode process to encode process the information on the at least one characteristic of the multiple streams of video frames between the encode processes; and wherein said dynamically adapting encoding comprises employing a joint rate control strategy distributed among said multiple encode processes, and wherein each encode process of said multiple encode processes ascertains said information derived on the at least one characteristic of its respective stream of video frames, saves said information, and shares said information among said multiple encode processes during said exchanging to allow determination by at least one encode process of said multiple encode processes of a total statistic corresponding to a sum of the information derived on the at least one characteristic by each encode process of the multiple encode processes, and wherein said directly exchanging further comprises sharing the total statistic among the multiple encode processes, wherein at least one encode process employs the total statistic and its own information during said dynamically adapting encoding to facilitate said dynamically encoding of the at least one stream of video frame of the multiple streams of video frames.

43. The at least one program storage device of claim 42, further comprising providing an exchange interface within the multiple encode processes, wherein said exchange interface facilitates said directly exchanging encode process to encode process of said information derived on the at least one characteristic of each stream of video frames.

44. The at least one program storage device of claim 42, further comprising multiplexing resultant compressed video streams output by said multiple encode processes onto a constant bit rate channel, and wherein said distributed rate control strategy facilitates partitioning of said constant bit rate channel capacity among said multiple encode processes.

45. The at least one program storage device of claim 42, wherein said at least one controllable encode parameter comprises a bit rate employed by at least one encode process of said multiple encode processes.

* * * * *